US012654790B2

(12) United States Patent
Cao et al.

(10) Patent No.: US 12,654,790 B2
(45) Date of Patent: Jun. 16, 2026

(54) TUNNEL OPERATION ROBOT

(71) Applicants:China Railway Design Corporation (CRDC), Tianjin (CN); TSDI(Tianjin)Testing Technology Co., Ltd, Tianjin (CN)

(72) Inventors: Hu Cao, Tianjin (CN); Pan Huang, Tianjin (CN); Bo Li, Tianjin (CN); Ji Zhang, Tianjin (CN); ChunShan Ren, Tianjin (CN); ShiQi Liu, Tianjin (CN); Yin Wang, Tianjin (CN); ZhiHua Li, Tianjin (CN); MingFeng He, Tianjin (CN)

(73) Assignees: China Railway Design Corporation (CRDC), Tianjin (CN); TSDI(Tianjin)Testing Technology Co., Ltd, Tianjin (CN)

( * ) Notice: Subject to any disclaimer, the term of this patent is extended or adjusted under 35 U.S.C. 154(b) by 387 days.

(21) Appl. No.: 18/369,476

(22) Filed: Sep. 18, 2023

(65) Prior Publication Data

US 2024/0092438 A1      Mar. 21, 2024

(30) Foreign Application Priority Data

Sep. 19, 2022     (CN) .......................... 202211135714.4

(51) Int. Cl.
*B62D 57/024*          (2006.01)
*E21F 17/18*          (2006.01)
(52) U.S. Cl.
CPC ............ *B62D 57/024* (2013.01); *E21F 17/18* (2013.01)
(58) Field of Classification Search
CPC ....... B62D 57/024; B62D 63/04; E21F 17/18; E21F 17/00; B64U 2101/26;
(Continued)

(56) References Cited

U.S. PATENT DOCUMENTS

2016/0325829 A1* 11/2016 Ahn ....................... B64U 10/14
2018/0057157 A1    3/2018 Groninga
(Continued)

FOREIGN PATENT DOCUMENTS

CN          107826247 A  *  3/2018  ............. B64C 1/068
CN          108731736 A      11/2018
(Continued)

OTHER PUBLICATIONS

The State Intellectual Property Office of People's Republic of China. First Search Report for CN Application No. 2022111357144 and English translation, mailed Oct. 24, 2022.
(Continued)

*Primary Examiner* — Drew J Brown
(74) *Attorney, Agent, or Firm* — Leason Ellis LLP

(57) ABSTRACT

A tunnel operation robot includes a robot body, a walking module, a fixed wing module and a plurality of rotatable wing modules. Both sides of the robot body are provided with cantilever parts, which are collinearly arranged. The walking module is arranged on the robot body. The fixed wing module includes a fixed fan, is fixedly arranged on the robot body, and is configured to provide a pressure for the walking module to be attached to and pressed against the tunnel wall surface. The plurality of rotatable wing modules are respectively arranged on the cantilever parts on both sides of the robot body, and include a rotatable rotating fan and a wind direction adjustment driver. Each rotating fan has a rotation axis parallel to the cantilever parts and an air outlet direction perpendicular to the cantilever parts, and the wind direction adjustment driver is connected to the rotating fan.

8 Claims, 5 Drawing Sheets

(58) Field of Classification Search
  CPC .... B64U 2101/70; B64U 10/10; B64U 10/70; B64U 30/26; B64U 30/29; G01M 3/005; B64C 27/32
  See application file for complete search history.

(56) References Cited

U.S. PATENT DOCUMENTS

| | | | |
|---|---|---|---|
| 2018/0105266 A1* | 4/2018 | Lee | G05D 1/0027 |
| 2020/0142052 A1* | 5/2020 | Liu | G01S 13/865 |
| 2021/0309353 A1 | 10/2021 | Gil | |
| 2021/0310895 A1* | 10/2021 | McDaniel | G01M 5/0025 |

FOREIGN PATENT DOCUMENTS

| | | | | | |
|---|---|---|---|---|---|
| CN | 109455242 A | | 3/2019 | | |
| CN | 111055948 A | | 4/2020 | | |
| CN | 111176332 A | * | 5/2020 | | B64C 39/02 |
| CN | 111645855 A | * | 9/2020 | | B64C 27/08 |
| CN | 112937713 A | | 6/2021 | | |
| CN | 113126088 A | * | 7/2021 | | B64U 10/10 |
| CN | 113220009 A | | 8/2021 | | |
| CN | 113771979 A | * | 12/2021 | | B62D 57/024 |
| CN | 114801615 A | | 7/2022 | | |
| CN | 115489632 A | * | 12/2022 | | B62D 57/024 |
| CN | 119319503 A | * | 1/2025 | | B60B 19/006 |
| CN | 120397318 A | * | 8/2025 | | B63G 8/38 |
| JP | 2011194937 A | | 10/2011 | | |
| WO | WO-2020191489 A1 | * | 10/2020 | | B64C 27/08 |
| WO | WO-2022119503 A1 | * | 6/2022 | | B64U 10/14 |

OTHER PUBLICATIONS

The State Intellectual Property Office of People's Republic of China. First Office Action for CN Application No. 2022111357144 and English translation, mailed Oct. 28, 2022.

The State Intellectual Property Office of People's Republic of China. Supplementary Search Report for CN Application No. 2022111357144 and English translation, mailed Nov. 4, 2022.

EPO, Search Report and Office Action for EP Application No. 23197978, mailed Jan. 17, 2024.

* cited by examiner

TUNNEL OPERATION ROBOT

CROSS-REFERENCE TO RELATED APPLICATION

This application is based on and claims the benefit of priority from Chinese Patent Application No. 2022111357144, filed on 19 Sep. 2022, the entirety of which is incorporated by reference herein.

TECHNICAL FIELD

The disclosure relates to the technical field of robots, in particular to a tunnel operation robot.

BACKGROUND

With the continuous and rapid development of the national economy, more and more investment has been made in infrastructure. Under this background, a large number of road and railway tunnels have appeared. In the operation of the tunnel, it is necessary to detect and prevent the leakage, freezing and thawing of the tunnel, lining damage and other diseases, and at the same time clean and maintain the tunnel. In the related art, the tunnel operation robot includes a power supply and a rotating fan, and the power supply provides power to the rotation fan to make the rotation fan work, thereby keeping the tunnel operation robot suspended. As the requirements for tunnel operations become more and more stringent, the operating devices on tunnel operation robots are becoming more and more complex and heavier. In order to ensure the work requirements, the current common practice is to increase the radius of the rotating fan, and increasing the radius of the rotating fan usually increases the size of the tunnel operation robot in different directions. Furthermore, due to the influence of the included angle between the bottom of the tunnel and the ground, and the curvature of the tunnel itself, it is prone to encountering work blind spots due to interference issues in the direction contained within the cross section of the tunnel.

SUMMARY

The disclosure aims to solve at least one of the technical problems in the existing technology. For this reason, the disclosure proposes a tunnel operation robot, which has a relatively large load capacity, and is not prone to encountering work blind spot due to interference issue, and is more convenient to control.

The tunnel operation robot according to the embodiment of the disclosure includes a robot body, a walking module, a fixed wing module and a plurality of rotatable wing modules. Both sides of the robot body are provided with protruding cantilever parts, and the cantilever parts on both sides are collinearly arranged. The walking module is arranged on the robot body, and is configured to drive the robot body to walk and steer on a tunnel wall surface. The fixed wing module includes a fixed fan and is arranged on the robot body, and is configured to provide a pressure for the walking module to be pressed and attached to the tunnel wall surface. The plurality of rotatable wing module are respectively arranged on the cantilever parts on both sides of the robot body, and include a rotatably arranged rotating fan and a wind direction adjustment driver. Each rotating fan has a rotation axis parallel to an extension direction of the cantilever parts and an air outlet direction perpendicular to the extension direction of the cantilever parts, and the wind direction adjustment driver is connected to the rotating fan, and is configured to maintain the air outlet direction of the rotating fan downward to generate a thrust capable of balancing gravity.

The tunnel operation robot according to the embodiment of the disclosure has at least the following beneficial effects.

In the tunnel operation robot according to the embodiment of the disclosure, by means of the fixed wing module, i.e., by means of the thrust generated by the fixed fan in the fixed wing module, the walking module in the tunnel operation robot can be attached to and contact with the tunnel wall surface with a certain pressure. By arranging the rotatable wing modules, and enabling the rotating fans in the rotatable wing modules to keep the wind outlet direction downward under the drive of the wind direction adjustment driver, so that the rotatable wing modules can generate a thrust for balancing the gravity, and further by means of the walking module, the walking and steering of the tunnel operation robot on the wall surface can be realized. Therefore, the tunnel operation robot according to the embodiment of the disclosure can use the rotatable wing modules, the fixed wing module and the walking module to respectively realize suspension, wall pressing and attaching, and walking, the control process is simpler and easier to operate. Meanwhile, since there are multiple rotatable wing modules for generating an upward thrust, it can generate a more powerful lifting force to balance the gravity, so that the tunnel operation robot can bear greater gravity to carry an operation module with more comprehensive functions and larger weight. Moreover, since the rotatable wing modules are all connected to the cantilever parts collinearly arranged on both sides of the robot body, the plurality of rotatable wing modules arranged to enhance the lifting force are arranged along the same direction, so they only affect the size of the tunnel operation robot in the extension direction of the cantilever part, and it is not prone to encountering work blind spots due to interference issues in the direction contained within the cross section of the tunnel.

In some embodiments of the disclosure, the rotation axis of each rotating fan is located on the same straight line passing through a center of gravity of the tunnel operation robot.

In some embodiments of the disclosure, the rotatable wing modules on the cantilever parts on both sides of the robot body are arranged symmetrically.

In some embodiments of the disclosure, the rotatable wing modules are detachably connected to the cantilever parts.

In some embodiments of the disclosure, the rotatable wing module further includes a connecting frame and a rotating bracket, the rotating fan is arranged on the rotating bracket, and the wind direction adjustment driver is connected to the connecting frame and the rotating bracket, and is capable of driving the rotating bracket to rotate relative to the connecting frame, and the connecting frame is detachably connected to a corresponding one of the cantilever parts.

In some embodiments of the disclosure, the tunnel operation robot further includes a control module, the rotatable wing module further includes a thrust detection device, the thrust detection device is arranged between the rotating bracket and the rotating fan, and configured to detect a magnitude of the thrust transmitted from the rotating fan to the rotating bracket, and both the thrust detection device and the rotating fan are electrically connected to the control module.

In some embodiments of the disclosure, the tunnel operation robot further includes a mounting rod, a middle part of the mounting rod passes through the robot body, and both ends of the mounting rod protrude from the robot body to form the cantilever parts.

In some embodiments of the disclosure, a pressure detection device is provided between the robot body and the walking module, and the pressure detection device is configured to detect a pressure transmitted from the robot body to the walking module.

In some embodiments of the disclosure, the walking module includes a frame body, a walking assembly and a driving assembly, the walking assembly is arranged on the frame body and configured for walking and steering, the driving assembly is arranged on the frame body and connected to the walking assembly for driving, the frame body is detachably connected to the robot body, and the pressure detection device is arranged between the frame body and the robot body.

In some embodiments of the disclosure, a detection module is arranged inside the robot body, the detection module is configured to detect a tunnel, the frame body is arranged in a framework-model manner, a detection port is formed in a middle of the frame body, the detection module penetrates through the detection port, and a detection end of the detection module protrudes from the frame body.

Additional aspects and advantages of the disclosure will be pointed out in part in the following description, and in part will be apparent from the following description, or may be learned by practice of the disclosure.

BRIEF DESCRIPTION OF DRAWINGS

The above-mentioned and/or additional aspects and advantages of the disclosure will become apparent and comprehensible from the description of the embodiments in conjunction with the following drawings, wherein.

REFERENCE NUMERALS

Figure 1:
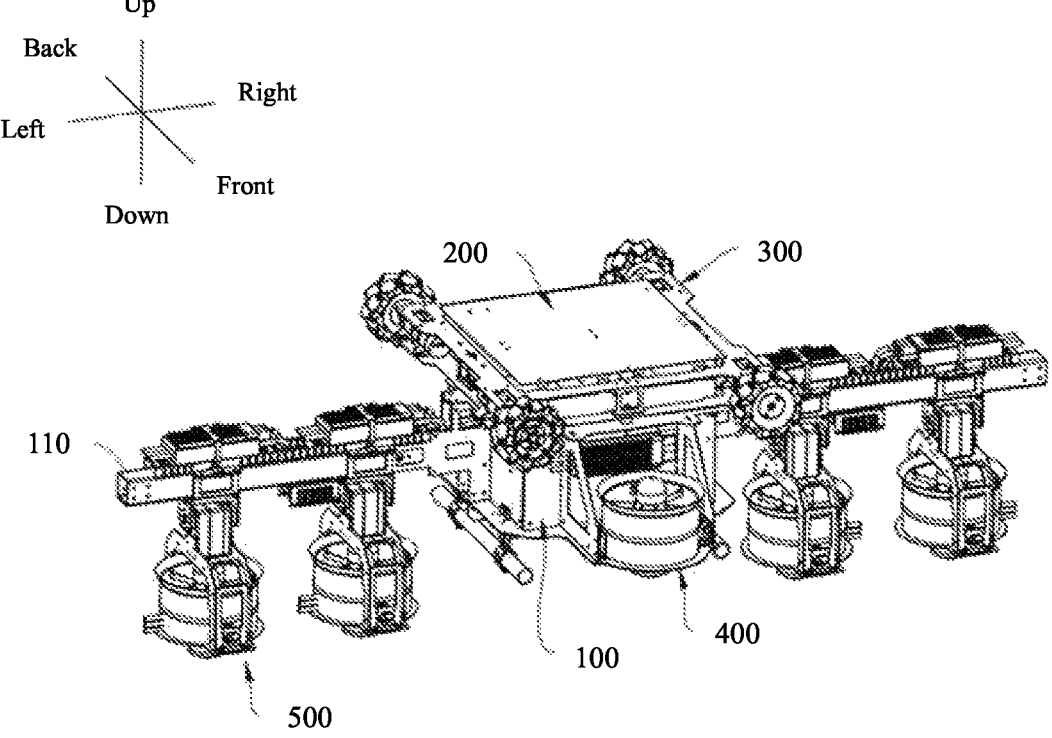
FIG. 1 is a three-dimensional schematic diagram of a tunnel operation robot according to an embodiment of the disclosure.

Robot body 100; cantilever part 110; detection module 200; walking module 300; second pressure sensor 310; frame body 320; detection port 321; walking assembly 330; driving assembly 340; fixed wing module 400; fixed fan 410; fixing bracket 420; rotatable wing module 500; rotating fan 510; ear plate 511; connecting piece 512; wind direction adjustment driver 520; connecting frame 530; first connection part 531; second connection part 532; first connection through hole 533; rotating bracket 540; abutting part 541; connecting plate 550; second connection through hole 551; thrust detection device 560.

DETAILED DESCRIPTION

Embodiments of the present disclosure will be described in detail below. Examples of the embodiments are illustrated in the accompanying drawings, where the same or like reference numerals throughout the figures indicate the same or like elements having the same or like functions. The embodiments described below with reference to the accompanying drawings are exemplary and are intended only to explain the present disclosure instead of being construed as limiting the present disclosure.

In the description of the present disclosure, it should be understood that, descriptions relating to orientation, for example, orientation or positional relationships indicated by "up", "down", "front", "back", "left", "right", etc. are based on the orientation or positional relationships shown in the accompanying drawings, and are to facilitate the description of the present disclosure and simplify the description only, rather than indicating or implying that the device or element referred to must have a specific orientation or be constructed and operated in a specific orientation, and therefore cannot be construed as limiting the present disclosure.

In the description of the present disclosure, if "first" and "second", etc. are referred to, it is only for the purpose of distinguishing technical features, and shall not be understood as indicating or implying relative importance or implying the number of the indicated technical features or implying the sequence of the indicated technical features.

In the description of the present disclosure, unless otherwise explicitly defined, the words such as "set", "install", and "connect" should be understood in a broad sense, and those having ordinary skills in the art can determine the specific meanings of the above words in the present disclosure in a rational way in combination with the specific contents of the technical solutions.

Referring to FIG. 1 to FIG. 6, the tunnel operation robot according to the embodiment of the disclosure will be described below.

Figure 2:
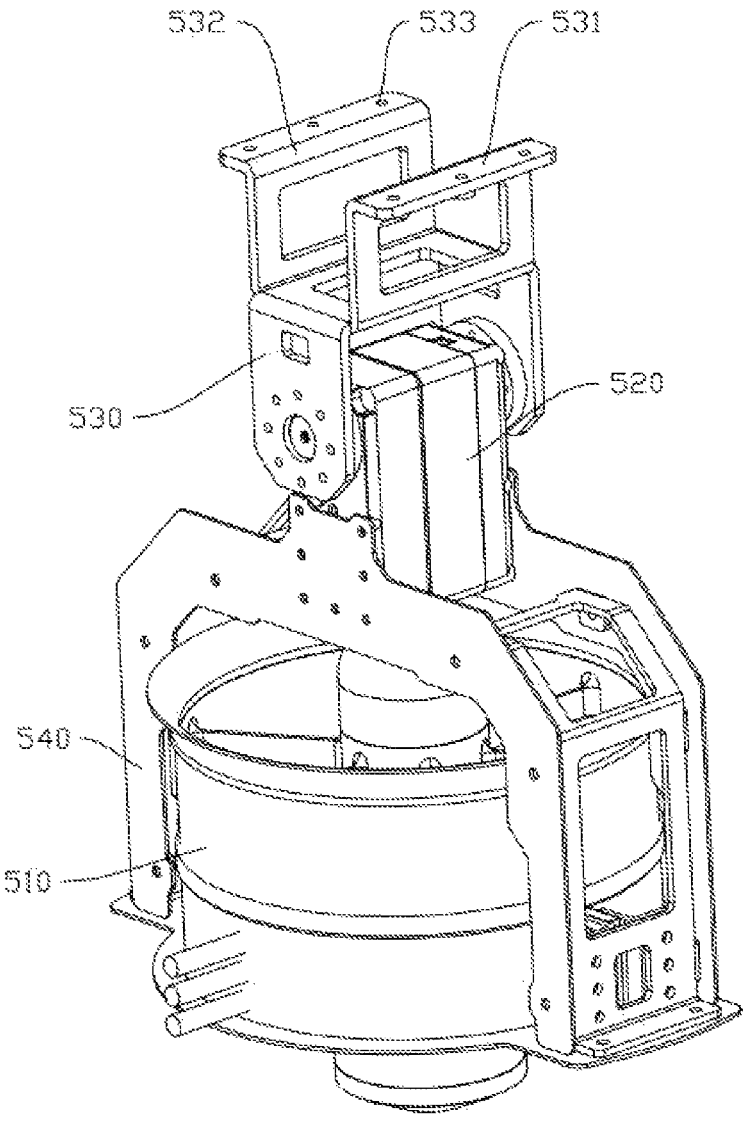
FIG. 2 is a schematic diagram of a rotatable wing module according to an embodiment of the disclosure.
Figure 5:
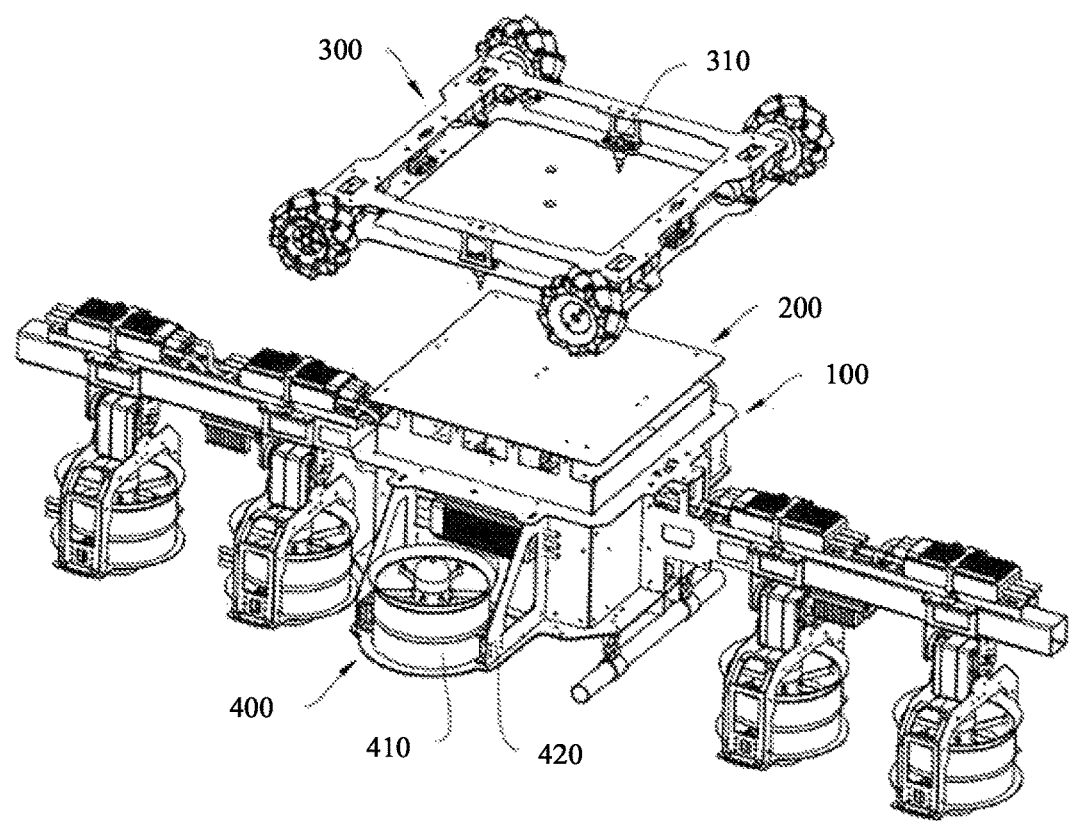
FIG. 5 is an explosive schematic diagram of the tunnel operation robot shown in FIG. 1.

Referring to FIG. 1, FIG. 2 and FIG. 5, a tunnel operation robot according to an embodiment of the disclosure includes a robot body 100, a walking module 300, a fixed wing module 400 and a plurality of rotatable wing modules 500.

Both sides of the robot body 100 are provided with protruding cantilever parts 110, and the cantilever parts 110 on both sides are collinearly arranged. The walking module 300 is arranged on the robot body 100, and is configured to drive the robot body 100 to walk and turn on a tunnel wall surface. The fixed wing module 400 is arranged on the robot body 100, and includes a fixed fan 410, and is configured to provide pressure for the walking module 300 to be pressed against the tunnel wall surface. The plurality of rotatable wing modules 500 are respectively arranged on the cantilever parts 110 on both sides of the robot body 100, and each include a rotatably arranged rotating fan 510 and a wind direction adjustment driver 520. Each rotating fan 510 has a rotation axis parallel to an extension direction of the cantilever part 110, and a wind outlet direction perpendicular to the extension direction of the cantilever part 110. The wind direction adjustment driver 520 is connected to the rotating fan 510 and is configured to keep the wind outlet direction of the rotary fan 510 downward to generate a thrust for balancing the gravity.

It can be understood that, in order to realize the tunnel operation, the tunnel operation robot may further be provided with an operation module. In this embodiment, specifically, the operation module is a detection module 200, and the detection module 200 is arranged inside the robot body 100. In order to avoid that the casing of the robot body 100 affects the detection operation of the detection module 200 on the tunnel, a detection end of the detection module 200 is exposed from the robot body 100, and the detection end is located on a side of the robot body 100 where the walking module 300 is disposed.

It should be understood that, in addition to being the above-mentioned detection module 200, the operation module can also be configured according to different types of operations required, and can also include multiple operation modules for completing various types of operations. For example, when a cleaning operation is required, in other embodiments, a vacuum cleaner, an air duct, and a cleaning roller brush similar to the sweeping robot can also be arranged inside the robot body 100, and the surrounding sides of the cleaning roller brush are exposed from the robot body 100, so as to be able to contact the tunnel wall surface to be cleaned. For example, when the image information of the tunnel needs to be collected, a camera device can also be arranged inside the robot body 100, and the camera of the camera device is exposed from the robot body 100, so as to be able to photograph the tunnel wall surface to be photographed. For example, the detection module 200 and the camera device can also be installed inside the robot body 100 at the same time.

It should be understood that, similarly, the detection module 200 can also be selected according to the category of items detected on the wall surface of the tunnel, for example, it can be a nuclear magnetic resonance detection device, an electromagnetic wave detection device and an ultrasonic detection device, etc., and the type of the detection module 200 is not specifically limited herein.

Specifically, when the wall surface of the tunnel is detected by the tunnel operation robot according to the embodiment of the disclosure, firstly, the side of the tunnel operation robot equipped with the walking module 300 is abutted against the wall surface of the tunnel by manually grabbing the tunnel operation robot (at this time, the cantilever part 110 of the tunnel operation robot is close to a horizontal state, and the extension direction of the cantilever part 110 is roughly close to the extension direction of the tunnel, that is, the length direction of the tunnel). Then the tunnel operation robot is be started to work in the tunnel. After the tunnel operation robot is started, both the fixed-wing module 400 and the rotatable wing module 500 start to work. At the same time, the attitude detection mechanism such as gyroscope installed inside the robot body 100 will automatically detect the attitude state of the tunnel operation robot. According to the detected attitude, the walking module 300 works and performs quick adjustments such as walking and steering, so that the cantilever part 110 is in a horizontal state, that is, the leveling of the cantilever part 110 is completed (since the rotation axis of the rotating fan 510 is parallel to the extension direction of the cantilever part 110, when the cantilever part 110 is adjusted to a horizontal state, it is convenient to adjust the rotating fan 510 to enable the air outlet direction to be vertically downward). Almost at the same time, the rotating fan 510 in the rotatable wing module 500 is also driven by the wind direction adjustment driver 520 to complete adjustment of the wind outlet direction to be vertically downward. Therefore, attachment to the wall and suspension can be realized by means of the fixed wing module 400 and the rotatable wing module 500. In the detection process, the walking module 300 drives the entire tunnel operation robot to walk on the wall surface of the tunnel, so that the tunnel operation robot can perform scanning detection on the tunnel wall surface. Moreover, in the detection process, considering that the curvature of the tunnel wall surface changes greatly in the direction of its cross section, but has less change in the length direction of the tunnel, so in order to avoid frequent and large angle adjustment of the rotating fan 510, in the detection process, the tunnel operation robot may move from one end of the tunnel to the other end of the tunnel along the extension direction of the tunnel, and then the tunnel operation robot may be controlled to move up or down by a position of the tunnel operation robot position along the contour of the tunnel wall on the cross section, and then continue to move from one end to the other end of the tunnel along the extension direction of the tunnel.

It can be seen from the above detection process that the cantilever part 110 is always kept horizontal in the detection process, and is basically parallel to the extension direction of the tunnel. Moreover, the plurality of rotatable wing modules 500 arranged to achieve a larger load are installed in a row on the cantilever part 110. Therefore, arrangement of the plurality of rotatable wing modules 500 only affects the size of the tunnel operation robot in the tunnel extension direction, and does not affect the size of the tunnel operation robot in the direction contained within the cross section of the tunnel, so it is not prone to encountering work blind spots due to interference issues in the direction contained within the cross section of the tunnel.

To sum up, it can be understood that, in the tunnel operation robot according to the embodiment of the disclosure, by means of the fixed wing module 400, i.e., by means of the thrust generated by the fixed fan 410 in the fixed wing module 400, the walking module 300 in the tunnel operation robot can be attached to and contact with the tunnel wall surface with a certain pressure. By arranging the rotatable wing modules 500, and enabling the rotating fans 510 in the rotatable wing modules 500 to keep the wind outlet direction downward under the drive of the wind direction adjustment driver 520, so that the rotatable wing modules 500 can generate a thrust for balancing the gravity, and further by means of the walking module 300, the walking and steering of the tunnel operation robot on the wall surface can be realized. Therefore, the tunnel operation robot according to the embodiment of the disclosure can use the rotatable wing modules 500, the fixed wing module 400 and the walking module 300 to respectively realize suspension, wall pressing and attaching, and walking, the control process is simpler and easier to operate. Meanwhile, since there are multiple rotatable wing modules 500 for generating an upward thrust, it can generate a more powerful lifting force to balance the gravity, so that the tunnel operation robot can bear greater gravity to carry a detection module 200 with more comprehensive functions and larger weight or other types of operation modules. Moreover, since the rotatable wing modules 500 are all connected to the cantilever parts 110 collinearly arranged on both sides of the robot body 100, the plurality of rotatable wing modules arranged to enhance the lifting force are arranged along the same direction, so they only affect the size of the tunnel operation robot in the extension direction of the cantilever part 110, and it is not prone to encountering work blind spots due to interference issues in the direction contained within the cross section of the tunnel.

It can be understood that, in some embodiments, in order to better balance the gravity and prevent the tunnel operation robot from overturning due to the overturning torque generated by the gravity and the lifting force provided by the rotatable wing modules 500, the rotation axes of the rotating fans 510 are all located on the same straight line passing through the center of gravity of the tunnel operation robot, so that the tunnel operation robot can be more stable when working.

It can be understood that, in some embodiments, the rotatable wing modules 500 on the cantilever parts 110 on both sides of the robot body 100 are arranged symmetrically. In case that the rotating fans 510 have the same specification, the lifting force generated by each rotating fan 510 when rotating at the same speed is basically the same. By symmetrically arranging the rotating wing modules 500 on both sides of the robot body 100, it is easier to keep the tunnel operation robot in balance and avoid overturning when each rotating fan 510 rotates at the same speed. Therefore, it is convenient to uniformly control the rotating speed of each rotating fan 510 when the tunnel operation robot works, so as to further improve the control convenience of the tunnel operation robot.

It can be understood that, in an embodiment, the rotatable wing modules 500 are detachably connected to the cantilever part 110. By detachably connecting the rotatable wing modules 500 to the cantilever part 110, it is convenient for the tunnel operation robot to increase or decrease the number of the rotatable wing modules 500 according to the weight of the detection module 200 carried. When the weight is relatively heavy, the rotatable wing module 500 may be added on the cantilever part 110, and when the weight is relatively light, the rotatable wing module 500 may be removed.

Figure 3:
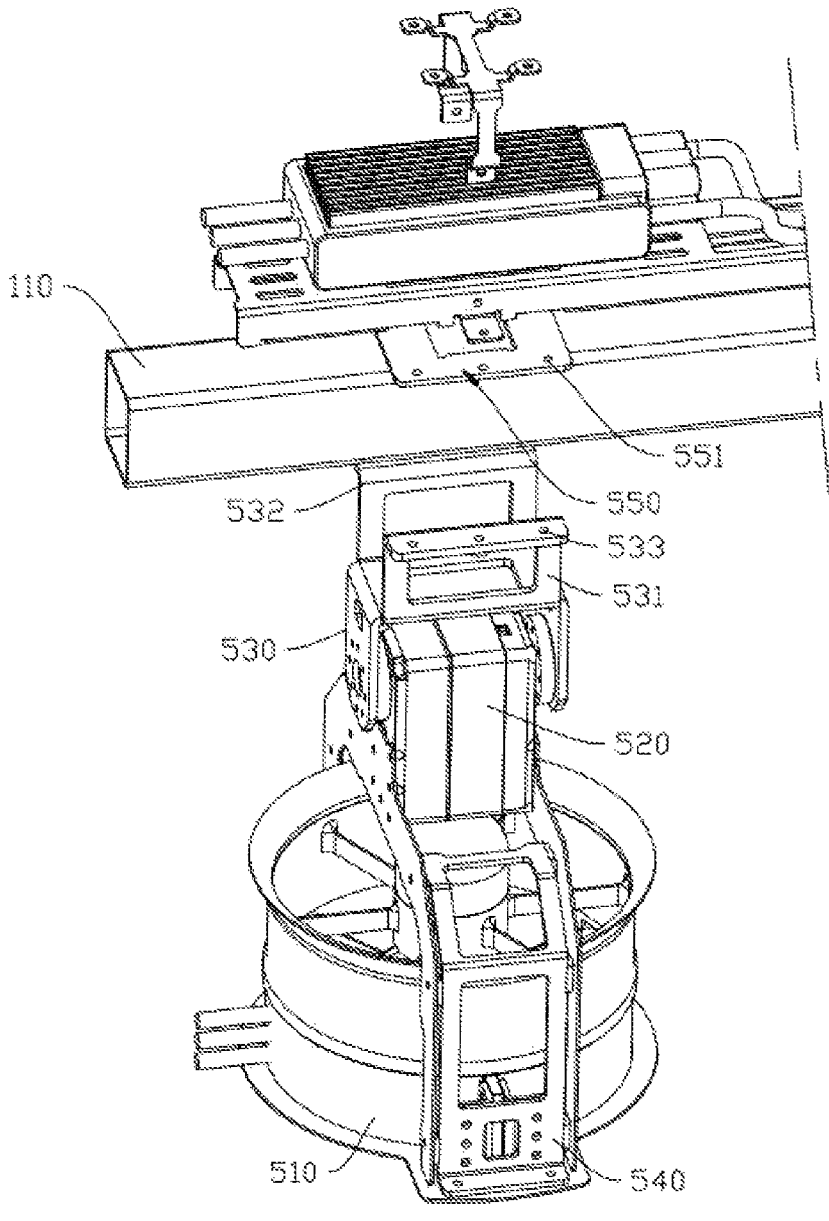
FIG. 3 is a schematic diagram illustrating the connection relationship between the rotatable wing module and the cantilever part according to an embodiment of the disclosure.

It can be understood that, in an embodiment, in order to facilitate the detachable connection of the rotatable wing module 500, and also to facilitate the rotatable setting of the rotating fan 510, referring to FIG. 2 and FIG. 3, specifically, the rotatable wing module 500 further includes a connecting frame 530 and a rotating bracket 540, wherein the rotating fan 510 is arranged on the rotating bracket 540, the wind direction adjustment driver 520 is connected with the connecting frame 530 and the rotating bracket 540, and can drive the rotating bracket 540 to rotate relative to the connecting frame 530, and the connecting frame 530 is detachably connected with the cantilever part 110.

It can be understood that, in order to realize the detachable connection between the connecting frame 530 and the cantilever part 110, in an embodiment, the connecting frame 530 includes a first connecting part 531 and a second connecting part 532 arranged side by side, the first connecting part 531 and the second connecting part 532 are each provided with first connecting through holes 533. Specifically, the rotatable wing module 500 further includes a connecting plate 550, and the connecting plate 550 is provided with second connecting holes 551 corresponding to the first connecting through holes 533. A first threaded connector passes through the first connecting through hole 533 and is screwed into the second connecting through hole 551. The cantilever part 110 passes through a first clamping area formed by the first connecting part 531, the second connecting part 532 and the connecting plate 550. Referring to FIG. 1 to FIG. 3, specifically, the cantilever part 110 may extend along the left and right directions, the connecting plate 550 may be located at an upper end of the cantilever part 110, and the connecting plate 550 may be respectively provided with two second connecting through holes 551 at a front end and a rear end. Correspondingly, the first connecting part 531 may be provided with two first connecting through holes 533, the second connecting part 532 may be provided with two first connecting through holes 533, and the first connecting part 531 may be located at a front side of the second connecting part 532. The first threaded connector may be provided in four. The first threaded connector may be a screw, and correspondingly, the second connecting through hole 551 is a threaded hole, the first connecting through hole 533 is a through hole. The first connecting through holes 533 in the connecting part 531 may correspond to the second connecting through holes 551 at the front end of the connecting plate 550. Two screws may be connected to the first connecting through holes 533 in the first connecting part 531 and the second connection through holes 551 at the front end of the connecting plate 550, so that the first connecting part 531 is connected to the front end of the connecting plate 550. The first connecting through holes 533 in the second connecting part 532 may correspond to the second connecting through holes 551 at the rear end of the connecting plate 550, and the other two screws may be connected to the first connecting through holes 533 in the second connecting part 532 and the second connecting through holes 551 at the rear end of the connecting plate 550, so that the second connecting part 532 is connected to the rear end of the connecting plate 550. Meanwhile, a first clamping area is formed by the first connecting part 531, the second connecting part 532 and the connecting plate 550, and the cantilever part 110 may pass through the first clamping area, so that the rotatable wing module 500 is fixed on the cantilever part 110.

It should be understood that, in some other embodiments, the second connection through hole 551 may also be directly provided on the cantilever part 110, and the screw passing through the first connection through hole 533 and the second connection through hole 551 may be directly used to connect the connecting frame 530 to the cantilever part 110.

It can be understood that, in order to facilitate the forming and installation of the cantilever part 110 on the robot body 100, and also to improve the load-bearing capacity of the cantilever part 110, in an embodiment, the tunnel operation robot further includes a mounting rod, and a middle part of the mounting rod is penetrated through the robot body 100, and both ends of the mounting rod protrude from the robot body 100 to form the cantilever parts 110. Specifically, a shell of the robot body 100 is provided with a perforation that allows the mounting rod to pass through. The middle part of the mounting rod is located inside the shell of the robot body 100, and the mounting rod pass through the above perforation. Moreover, in order to make sure that the lengths of the cantilever parts 110 at left and right sides of the robot body 100 can be the same, left and right ends of the mounting rod exposed from the robot body 100 have the same length.

It should be understood that, in some other embodiments, it is also possible to select two rods and connect the two rods to the left and right sides of the robot body 100 through a fastener to form two cantilever parts 110 respectively.

Figure 4:
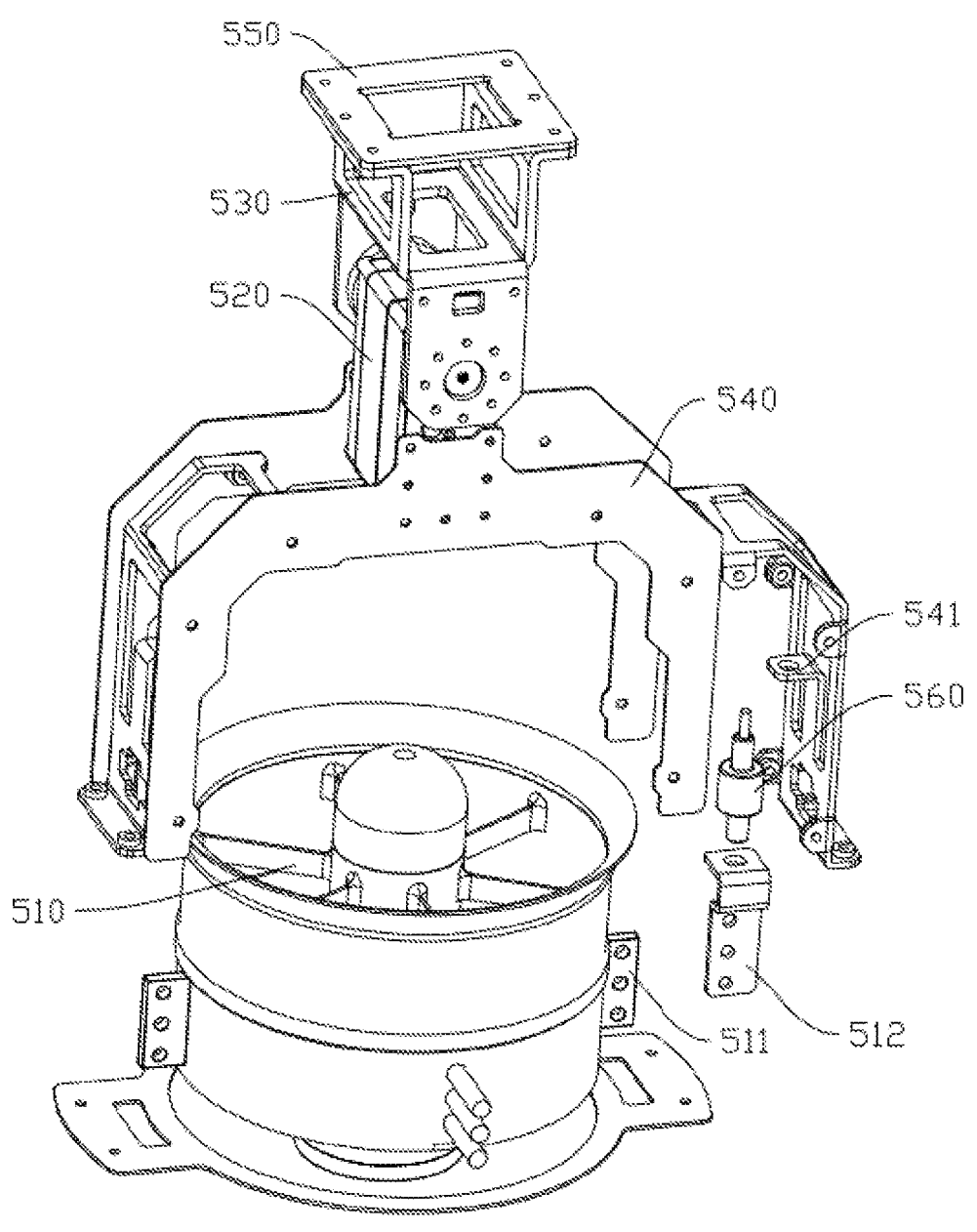
FIG. 4 is a schematic diagram illustrating the connection relationship between the thrust detection device, the rotating fan and the rotating bracket in another embodiment of the disclosure.

It can be understood that, in another embodiment of the disclosure, the tunnel operation robot further includes a control module (not shown in the drawings). Referring to FIG. 4, the rotatable wing module 500 further includes a thrust detection device 560 arranged between the rotating bracket 540 and the rotating fan 510 and configured to detect a thrust transmitted from the rotating fan 510 to the rotating bracket 540. Both the thrust detection device 560 and the rotating fan 510 are electrically connected to the control module. During operating of the tunnel operation robot, the control module will obtain a theoretical thrust value required to be generated by each rotating fan 510 according to the gravity or acceleration of the tunnel operation robot, and control the rotating speed of the rotating fan 510 according to the theoretical thrust value. The thrust detection device 560 is configured to detect an actual thrust value transmitted to the rotating bracket 540 when the rotating fan 510 is working, so as to adjust the speed of each rotating fan 510 according to the deviation between the actual thrust value and the theoretical thrust value. For example, when the actual thrust value is smaller than the theoretical thrust value, the actual thrust value is increased by increasing the rotating speed of the rotating fan 510, and when the actual thrust value is greater than the theoretical thrust value, the actual thrust value is reduced by reducing the rotating speed of the rotating fan 510, thereby further improving the control accuracy through a closed-loop control.

In an embodiment, specifically, a connecting piece 512 is provided on an outer side surface of the rotating fan 510, an abutting part 541 is provided on the rotating bracket 540. The abutting part 541 and the connecting piece 512 are arranged along a direction parallel to the axis of the rotating fan 510, and the abutting part 541 is located at a side of the connecting piece 512 close to an air suction port of the rotating fan 510. The thrust detection device 560 is a first pressure sensor, and the first pressure sensor is arranged between the connecting piece 512 and the abutting part 541, so that when the rotating fan 510 is working, it can move towards the abutting part 541 under its own thrust, to press against the first pressure sensor through the connecting piece 512, thereby detecting the magnitude of the thrust transmitted from the rotating fan 510 to the rotating bracket 540.

Specifically, the rotating fan 510 adopts a ducted fan, and the ducted fan includes a ducted cylinder, and fan blades and a motor arranged in the ducted cylinder. Both sides of the ducted cylinder are provided with an ear plate 511, and there are two connecting pieces 512 which are respectively connected to the two ear plates 511. Similarly, there are also two abutting parts 541, which are arranged corresponding to the two connecting pieces 512 respectively. The first pressure sensor is arranged between each of the abutting parts 541 and a respective one of the connecting pieces 512.

It can be understood that, in an embodiment of the disclosure, referring to FIG. 5, similarly, the fixed fan 410 also adopts a ducted fan, and the fixed wing module 400 further includes a fixing bracket 420. The ducted fan in the fixed wing module 400 is fixedly connected to the fixing bracket 420, and the fixing bracket 420 is fixedly connected to the robot body 100. Specifically, there are two fixed wing modules 400, which are respectively arranged on a front side and a rear side of the robot body 100, so as to avoid the installation positions of the rotatable wing modules 500.

Figure 6:
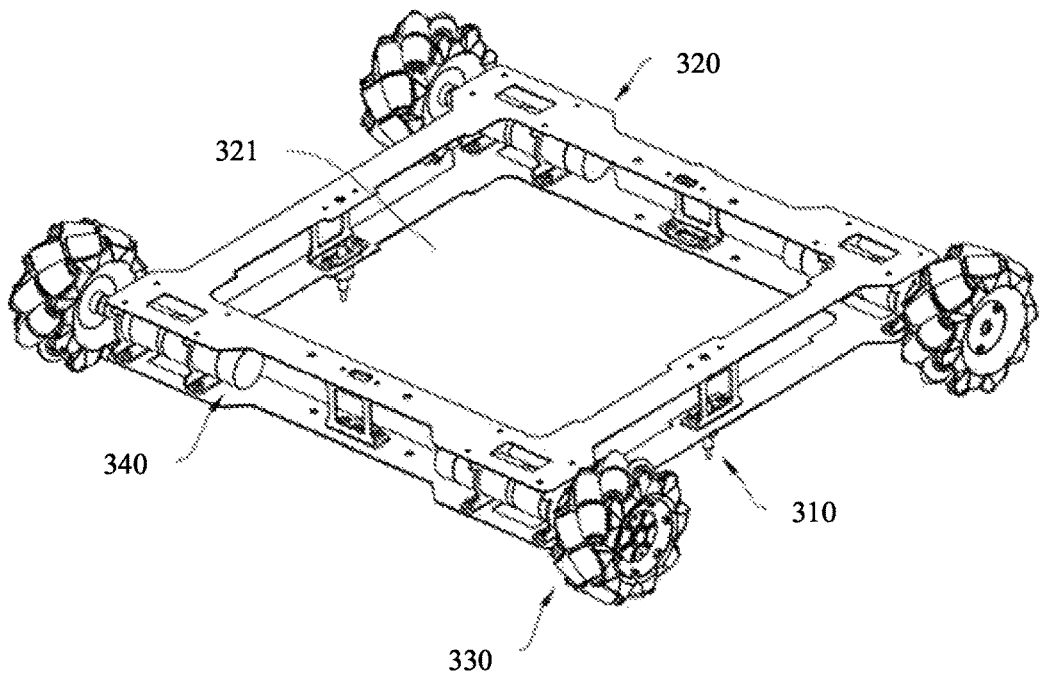
FIG. 6 is a schematic diagram of a walking module according to an embodiment of the disclosure.

Referring to FIG. 5 and FIG. 6, it can be understood that, in an embodiment of the disclosure, a pressure detection device is provided between the robot body 100 and the walking module 300, and the pressure detection device is configured to detect a pressure transmitted from the robot body 100 to the walking module 300. Specifically, the pressure detection device includes a second pressure sensor 310, and the second pressure sensor 310 is disposed on the walking module 300 and abuts against the robot body 100.

It should be understood that, in some other embodiments, the second pressure sensor 310 may also be disposed on the robot body 100 and abut against the walking module 300.

In an embodiment, similarly, the control module is also electrically connected to the fixed fan 410, and can control the pressure exerted by the robot body 100 to the walking module 300 by controlling the speed of the fixed fan 410.

When the second pressure sensor 310 detects that the pressure on the walking module 300 is greater than a set value, a pressure signal is sent to the control module, and the control module controls the fixed fan 410 to reduce the speed, so as to reduce the pressure exerted by the robot body 100 to the walking module 300. When the second pressure sensor 310 detects that the pressure on the walking module 300 is less than the set value, a pressure signal is sent to the control module, and the control module controls the fixed fan 410 to increase the speed, so as to increase the pressure exerted by the robot body 100 to the walking module 300.

It can be understood that, in an embodiment, the walking module 300 includes a frame body 320, a walking assembly 330 and a driving assembly 340. The walking assembly 330 is arranged on the frame body 320 and configure for walking and steering. The driving assembly 340 is arranged on frame body 320 and connected with the walking assembly 330 for driving the walking assembly 330. The frame body 320 is detachably connected with the robot body 100. Specifically, the pressure detection device is disposed between the frame body 320 and the robot body 100.

It can be understood that, in an embodiment, specifically, the frame body 320 is detachably connected to the robot body 100 through a threaded fastener. It should be understood that, in some other embodiments, the frame body 320 may also be detachably connected to the robot body 100 in a snap-fit or clamping manner.

It can be understood that, referring to FIG. 5 and FIG. 6, in an embodiment, the driving assembly 340 includes a motor and a coupling, the motor is arranged on the frame body 320, one end of the coupling is connected to an output shaft of the motor, and the other end is connected with the walking assembly 330. Specifically, in this embodiment, the motors drive the corresponding walking assemblies 330 through the couplings, and through the differential speed control among the multiple motors, the multiple walking assemblies 330 can realize forward and backward walking and steering actions.

It can be understood that, referring to FIG. 5 and FIG. 6, in an embodiment, the walking assembly 330 is configured as a wheeled-model walking structure, the walking assembly 330 includes a driving wheel, and the driving wheel is connected to the coupling, and is driven by a motor to rotate. In an embodiment, the driving wheel adopts Mecanum wheel to realize walking and steering, so that the walking and steering of the walking module 300 are more flexible. In addition, in some other embodiments, the driving wheel may also use rubber wheel to realize walking and steering.

It should be understood that, in some other embodiments, the walking assembly 330 may also be configured as a crawler-model walking structure. Furthermore, in some other embodiments, the walking assembly 330 may also adopt a walk-model walking structure. Moreover, in some other embodiments, there are multiple walking modules 300, and the walking modules 300 adopt different walking assemblies 330, such as respectively adopting a wheeled-model walking structure, a crawler-model walking structure or a walk-model walking structure, so that the tunnel operation robot can adapt to the walking requirements of different environments by selecting and replacing the walking module 300 with a walking assembly 330 of a different form.

It should be understood that, in an embodiment, the walking module 300 is an independent module formed by combination of the frame body 320, the driving assembly 340 and the walking assembly 330, and the walking module 300 and the robot body 100 may be detachably connected, which makes the disassembly and assembly between the walking module 300 and the robot body 100 more conve-
nient, and when the walking module 300 fails, the walking
module 300 can be quickly removed from the robot body
100 for replacement or repairment, thereby ensuring the
efficiency for operation of the tunnel operation robot.

It can be understood that, referring to FIG. 5 and FIG. 6,
in an embodiment, the frame body 320 is configured in a
framework-mode, and a detection port 321 is formed in the
middle thereof, so that when the walking module 300 is
assembled with the robot body 100, the detection module
200 can be installed in the frame body 320, and the detection
end of the detection module 200 can extend out of the frame
body 320. Specifically, after the walking module 300 is
assembled with the robot body 100, the frame body 320 is
placed around the detection module 200 to reduce the space
occupied by the walking module 300 during installation and
make the overall structure of the tunnel operation robot more
compact. In order to ensure a better detection effect, the
distance between the detection end surface of the detection
module 200 and the tunnel wall surface to be detected is
controlled between 5 mm-15 mm, that is, the distance
between the point which is farthest from the robot body in
the driving wheel and the plane where the detection end
surface of the detection module 200 is located is between 5
mm-15 mm, and in an embodiment, is specifically 10 mm,
so as to achieve the best detection effect.

In an embodiment, an elastic pad (not shown in the
drawings) is further included, the elastic pad is arranged
between the frame body 320 and the robot body 100, and the
elastic pad can be elastically deformed when pressed by an
external force, so as to allow the frame body 320 close to the
robot body 100. Specifically, the relative movement between
the frame body 320 and the robot body 100 is enabled
through the arrangement of the elastic pad, so that the
second pressure sensor 310 can detect the pressure on the
frame body 320.

While embodiments of the disclosure have been shown
and described, it will be understood by those of ordinary
skill in the art that various changes, modifications, substi-
tutions and variations can be made to these embodiments
without departing from the principle and gist of the disclo-
sure, the scope of the disclosure is defined by the claims and
their equivalents.

What is claimed is:

1. A tunnel operation robot, comprising:
a robot body, provided with protruding cantilever parts on
both sides, wherein the cantilever parts on both sides
are collinearly arranged;
a walking module, arranged on the robot body and con-
figured to drive the robot body to walk and steer on a
tunnel wall surface;
a fixed wing module, comprising a fixed fan, fixedly
arranged on the robot body, and configured to provide
a pressure for the walking module to be pressed against
the tunnel wall surface; and
a plurality of rotatable wing modules, respectively
arranged on the cantilever parts on both sides of the
robot body, and comprising a rotatable rotating fan and
a wind direction adjustment driver, wherein each rotat-
ing fan has a rotation axis parallel to an extension direction of the cantilever parts and an air outlet
direction perpendicular to the extension direction of the
cantilever parts, and the wind direction adjustment
driver is connected to the rotating fan, and configured
to maintain the air outlet direction of the rotating fan
downward to generate a thrust capable of balancing
gravity; the rotatable wing modules are detachably
connected to the cantilever parts;
wherein a pressure detection device is provided between
the robot body and the walking module, and the pres-
sure detection device is configured to detect a pressure
transmitted from the robot body to the walking module.

2. The tunnel operation robot according to claim 1,
wherein the rotation axis of each of the rotating fans is
located on the same straight line passing through a center of
gravity of the tunnel operation robot.

3. The tunnel operation robot according to claim 1,
wherein the rotatable wing modules on the cantilever parts
on both sides of the robot body are arranged symmetrically.

4. The tunnel operation robot according to claim 1,
wherein each of the rotatable wing modules further com-
prises a connecting frame and a rotating bracket, the rotating
fan is arranged on the rotating bracket, the wind direction
adjustment driver is connected to the connecting frame and
the rotating bracket, and is capable of driving the rotating
bracket to rotate relative to the connecting frame, and the
connecting frame is detachably connected to a correspond-
ing one of the cantilever parts.

5. The tunnel operation robot according to claim 4,
wherein the tunnel operation robot further comprises a
control module, the rotatable wing module further comprises
a thrust detection device, the thrust detection device is
arranged between the rotating bracket and the rotating fan,
and configured to detect a magnitude of the thrust transmit-
ted from the rotating fan to the rotating bracket, and both the
thrust detection device and the rotating fan are electrically
connected to the control module.

6. The tunnel operation robot according to claim 1,
wherein the tunnel operation robot further comprises a
mounting rod, a middle part of the mounting rod passes
through the robot body, and both ends of the mounting rod
protrude from the robot body to form the cantilever parts.

7. The tunnel operation robot according to claim 1,
wherein the walking module comprises a frame body, a
walking assembly and a driving assembly, the walking
assembly is arranged on the frame body and configured for
walking and steering, the driving assembly is arranged on
the frame body and connected to the walking assembly for
driving, the frame body is detachably connected to the robot
body, and the pressure detection device is arranged between
the frame body and the robot body.

8. The tunnel operation robot according to claim 7,
wherein a detection module is arranged inside the robot
body, the detection module is configured to detect a tunnel,
the frame body is arranged in a framework-model manner,
a detection port is formed in a middle of the frame body, the
detection module penetrates through the detection port, and
a detection end of the detection module protrudes from the
frame body.

\* \* \* \* \*